INVENTOR
Frederick A. Hurley
BY
Morgan, Finnegan, Durham & Pine
ATTORNEYS

INVENTOR
Frederick A. Hurley

BY
Morgan, Finnegan, Durham & Pine
ATTORNEY

PULSE DISTRIBUTOR

FREE-RUNNING MULTIVIBRATOR

INVENTOR
Frederick A. Hurley

BY
Morgan, Finnegan, Durham & Pine
ATTORNEYS

1

3,377,517
RELAY COMPUTER CIRCUITS
Frederick A. Hurley, Miami Shores, Fla., assignor, by mesne assignments, to Elliott & Evans, Inc., a corporation of Florida
Filed Feb. 13, 1964, Ser. No. 344,639
10 Claims. (Cl. 317—140)

ABSTRACT OF THE DISCLOSURE

A modular unit used in circuits performing various digital logic functions including an electromechanical relay, a capacitor and a diode. Pulse generators, flip-flop circuits, shift registers, pulse distributors and free-running multivibrator are formed by interconnecting the modular units.

This invention relates to computer circuits such as flip-flop circuits, shift registers, pulse distributors and the like, and relates more particularly to a modular unit including a relay which can be connected to provide a variety of different computer circuits. This invention also relates to the various computer circuits provided by specific interconnections of said modular unit.

In recent years, considerable work has been carried out in the development of high speed computer circuits primarily employing solid state components such as transistors, controlled rectifiers, and the like. In many installations, particularly large computer installations, the high operating speeds of these computer components is essential, since the operating speed of the computer components materially affects the data handling capacity and over-all efficiency of the system. The disadvantages of the high speed computer components are their inherent high cost, low current handling capacity, and the fact that the high speed computer components only provide one usable output. Where it is desired to increase current handling capacity, additional amplifiers or control circuits are required, and where it is desirable to increase the number of useful outputs, multiple computer components are usually employed, thus further increasing costs.

Thus, it is an object of the present invention to provide low cost computer components for installations where operating speed of the component is not a critical factor.

It is another object to provide inexpensive computer circuits having virtually unlimited current handling capacity.

Still another object is to provide inexpensive computer circuits having a virtually unlimited number of usable control outputs.

Yet another object of the invention is to provide a standardized inexpensive modular unit which can be connected, usually with other like modular units, to form flip-flop circuits, shift register circuits, pulse distributor circuits, free running multivibrator circuits, monostable pulse generator circuits, and the like.

The following specification, of which the accompanying drawings form a part, explains the manner in which the foregoing objects are attained in accordance with this invention. In the drawings:

FIG. 1 is a perspective view of a modular unit in accordance with one embodiment of this invention;

FIG. 2*a* is a schematic diagram of the modular unit illustrated in FIG. 1;

FIG. 2*b* is a schematic diagram of a modification of the modular unit shown in FIG. 2*a*;

FIG. 3 is a schematic diagram illustrating a monostable pulse generator utilizing the modular unit of FIG. 2*a*;

2

*Modular unit construction*

Figures 1, 2A, 2B, 3:
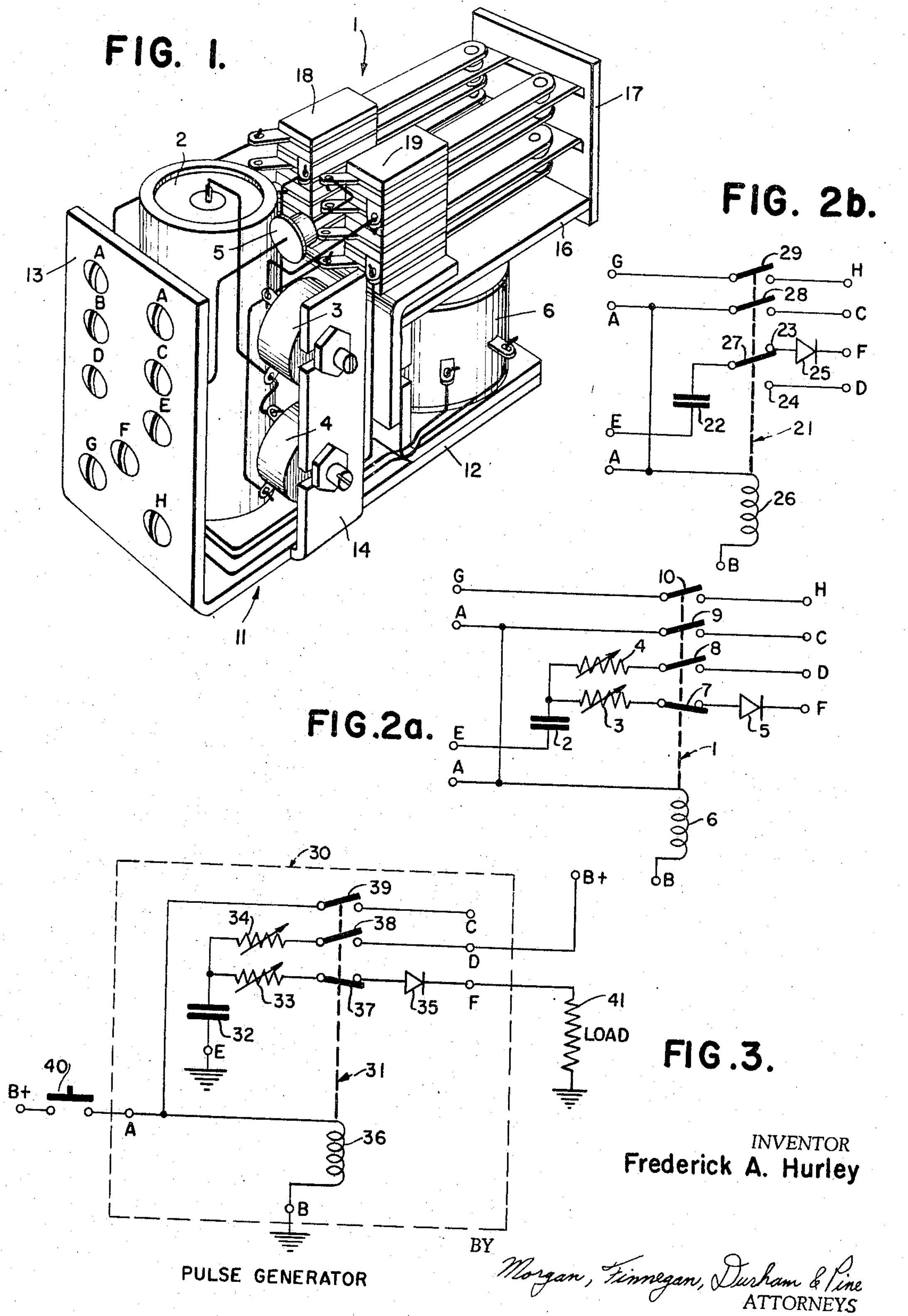

The modular unit includes an electromagnetic relay 1, a capacitor 2, two variable resistors 3 and 4, and a semi-conductor diode 5. These components are assembled as shown in FIG. 1 and are interconnected as shown schematically in FIG. 2*a*. The components are mounted on a suitable bracket 11 preferably formed from a plastic material having a comparatively high electrical resistance characteristic. Bracket 11 includes a rectangular base member 12 and two upwardly extending members 13 and 14, integral with the base member. Upwardly extending member 13 is secured to one end of base member 7, referred to as the front end of the apparatus for convenience, and is adapted to form a terminal strip and therefore includes a plurality of fillister head screws which cooperate with individual metallic threaded members embedded in the rear side (not shown) of member 13. These metallic members each include suitable soldering lugs for connection of conductors leading to the various electrical components. Upwardly extending member 14 is secured to one edge of base member 12 at a position closer to the forward end thereof, and includes therein a pair of slots suitably dimensioned and positioned to receive the stems of variable resistors 3 and 4.

Relay 1 is of conventional design and includes an actuating winding 6 and four sets of double throw contacts, each set of double throw contacts including a pair of spaced apart stationary contacts, each supported by a suitable contact arm, and a movable contact suitably supported on a resilient contact arm positioned between the stationary contacts. When the relay is de-energized, a movable contact is spring biased upwardly to engage the upper stationary contact, thus providing a set of normally closed contacts. The movable contact and the lower stationary contact provide a set of normally open contacts since armature 16, contact card 17 and the movable contact are urged downwardly so that the movable contact engages the lower stationary contact when actuating winding 6 is energized. The contact arms extend through insulation stacks 18 and 19 and terminate in suitable solder connection lugs. The particular relay selected must include two sets of normally open contacts and one set of normally closed contacts (but as will be pointed out hereinafter, a set of double throw contacts may in some cases serve as both a set of normally open and a set of normally closed contacts) as well as at least one additional set of contacts to provide a usable output. The number of additional contacts will depend upon the desired number of usable outputs from the assembled computer circuits.

The relay is also selected to have a rated contact current to provide the desired current handling capacity for the computer device. Electromagnetic relay 1 is secured to base member 12 in any suitable fashion and is preferably positioned nearer the rear of the apparatus with the relay connection terminals facing toward the front. Capacitor 2 is preferably an electrolytic capacitor having sufficient storage capacity to momentarily energize a relay actuating winding, such as winding 6, when the capacitor is discharged. Capacitor 2 is secured to bracket 11 by any suitable means (not shown) such as a spring clip arrangement secured to bracket 11. Variable resistors 3 and 4, as well as semiconductor diode 5, are selected to have a power rating sufficient for these elements to carry the charging and discharging current of capacitor 2. The stems of variable resistors 3 and 4 pass through the slots in member 14, and the resistors are secured in position by suitable hexagon nuts.

As is illustrated schematically in FIG. 2*a*, electromagnet relay 1 includes actuating winding 6, a set of normally closed contacts 7, and three sets of normally open contacts 8, 9 and 10. Actuating winding 6 is connected between a terminal B and a pair of other terminals, both designated A. Normally open contacts 9 are connected between terminal C and terminal A and hence normally open contacts 9 are also connected to one end of actuating winding 6. One plate of capacitor 2 is connected to a terminal E. The other plate of the capacitor is connected to a terminal D via variable resistor 4 and normally open contacts 8 connected in series, and also connected to terminal F via variable resistor 3, normally closed contact 7, and semiconductor diode 5 connected in series. The cathode of diode 5 is connected directly to terminal F. Normally open contacts 10 are connected between terminals G and H.

Variable resistors 4 and 3 control the charging and discharging time, respectively, for capacitor 2, and in some installations can be eliminated or replaced by a single resistor. Under these circumstances, the modular unit construction can be simplified somewhat as shown in FIG. 2*b*. In the modified structure, a relay 21 includes an actuating winding 26, two sets of normally open contacts 28 and 29, and a set of double throw contacts including a movable contact 27 which normally engages a stationary contact 23 and which engages a stationary contact 24 when the relay is energized. Actuating winding 26 is connected between a terminal B and a pair of other terminals both designated A. Normally open contacts 28 are connected between terminals A and C, and hence normally open contacts 28 are also connected to one end of actuating winding 26. One plate of capacitor 22 is connected to a terminal E and the other plate is connected to movable contact 27. Stationary contact 23 is connected to the anode of a semiconductor diode 25, and the cathode thereof is connected to a terminal F. Stationary contact 24 is connected directly to terminal D. Normally open contacts 29 are connected between terminals G and H. When it is desired to increase the charging and discharging time constant for capacitor 22, a fixed or variable resistor, as desired, can be inserted between capacitor 22 and movable contact 27.

The manner in which a modular unit, as shown in FIG. 2*a*, can be connected to form a pulse generator is illustrated in FIG. 3. This circuit is connected so that, subsequent to each actuation of a switch 40, an electrical pulse of a predetermined magnitude is supplied to the load 40. The modular unit is enclosed within dotted lines 30 and includes components 31–39 which correspond, respectively, to components 1–9, FIG. 2*a*. A normally open push button switch 40 is shown connected between a positive source of potential and terminal A. Terminals E and B are both connected to ground or to the negative side of the power supply and terminal D is connected to the positive source of potential. Terminal F is connected to ground via a resistor 41 which is representative of a load device.

When switch 40 is actuated, winding 36 is energized, thereby closing contacts 38 and opening contacts 37. Under these circumstances, capacitor 32 is charged from the positive source of potential via contacts 38 and resistor 34. Resistor 34 is adjusted to a relatively low impedance value, which permits the capacitor to become fully charged within the minimum anticipated time period during which switch 40 is to be held in closed position. Thereafter, when switch 40 is released, winding 36 is de-energized and therefore contacts 38 return to the open position and contacts 37 to the closed position. Accordingly, capacitor 32 discharges through resistor 33, contacts 37, diode 35 and load 41. Resistor 33 is adjusted to control the discharging time constant to obtain an electrical pulse through load resistor 41 of the desired configuration.

Figure 4:
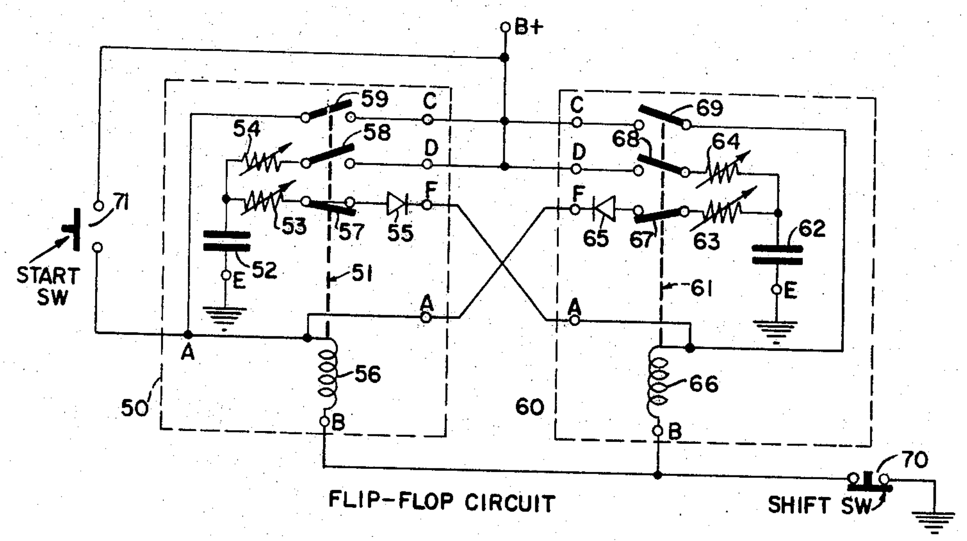
FIG. 4 is a schematic diagram illustrating the manner in which a pair of modular units can be interconnected in accordance with the invention to form a flip-flop circuit.

A pair of modular units 50 and 60 are shown interconnected in FIG. 4 to provide a flip-flop circuit. The components in modular unit 50 are designated by reference numerals 51–59, which correspond, respectively, to reference numerals 1–9, FIG. 2*a*, and the components in modular unit 60 are designated by reference numerals 61–9, similarly corresponding to reference numerals 1–9.

The C and D terminals of both of the modular units are connected to a positive source of potential and the E terminals of both modular units are connected to ground. A normally open push button start switch 71 is connected between one of the A terminals of modular unit 50 and the positive source of potential. The F terminal of modular unit 50 is connected to one of the A terminals of modular unit 60, and the F terminal of modular unit 60 is connected to the A terminal of modular unit 50. The B terminals are connected to one another and to ground via a normally closed push button shift switch 70. The usable outputs from the flip-flop circuits, i.e., the outputs used to control other apparatus, are derived via additional contacts such as contacts 10, FIG. 2*a*, or contacts 29, FIG. 2*b* associated with relays 51 and 61.

The flip-flop circuit is initially placed in operation by momentarily actuating start switch 71, thereby initially energizing winding 56 to close contacts 59. Contacts 59 provide a HOLD circuit for relay 51 and thus, when the relay is initially energized to close contacts 59, current will thereafter continue to flow through contacts 59, actuating winding 56, and shift switch 70 to maintain relay 51 in the energized state. When relay 51 is energized, contacts 58 are closed and therefore capacitor 52 is charged by current flowing through contacts 58 and resistor 54.

Thereafter, the alternate one of relays 51 and 61 is placed in the energized state with each subsequent actuation of shift switch 70. More specifically, upon the first actuation of shift switch 70, the HOLD circuit for actuating winding 56 is interrupted and therefore relay 51 returns to the de-energized state, with contacts 58 and 59 open and contacts 57 closed. Capacitor 52 is therefore connected to actuating winding 56. Subsequently, when shift switch 70 is returned to the normally closed position, capacitor 52 discharges via resistor 53, diode 55, actuating winding 66, and shift switch 70, thereby momentarily energizing relay 61. This causes contact 69 to close, providing a HOLD circuit for relay 61 by means of consoles through contact 69, actuating winding 66 and shift switch 70. When relay 61 is in the energized state, contacts 68 are closed and therefore capacitor 62 is charged via contact 68 and resistor 64.

The next time shift switch 70 is actuated, relay 61 is de-energized, since the HOLD circuit of that relay is interrupted, and therefore capacitor 62 discharges via resistor 63, contact 67, diode 65, actuating winding 56 and shift switch 70, thereby initially placing relay 51 in the energized state. Contacts 58 are closed to complete the HOLD circuit for relay 51.

Resistors 54 and 64 are adjusted to impedance values sufficiently low that the respective capacitors 52 and 62 are charged during the minimum anticipated time period between subsequent actuations of shift switch 70. Resistors 53 and 63 are adjusted so that the potential appearing across actuating windings 56 and 66, while the capacitors are discharging, remains for as long as possible above the level required for energization. Diode 55 provides isolation for capacitor 52 so that capacitor 52 cannot be charged by current flow through contacts 69, and diode 65 provides similar isolation for capacitor 62.

Figure 5:
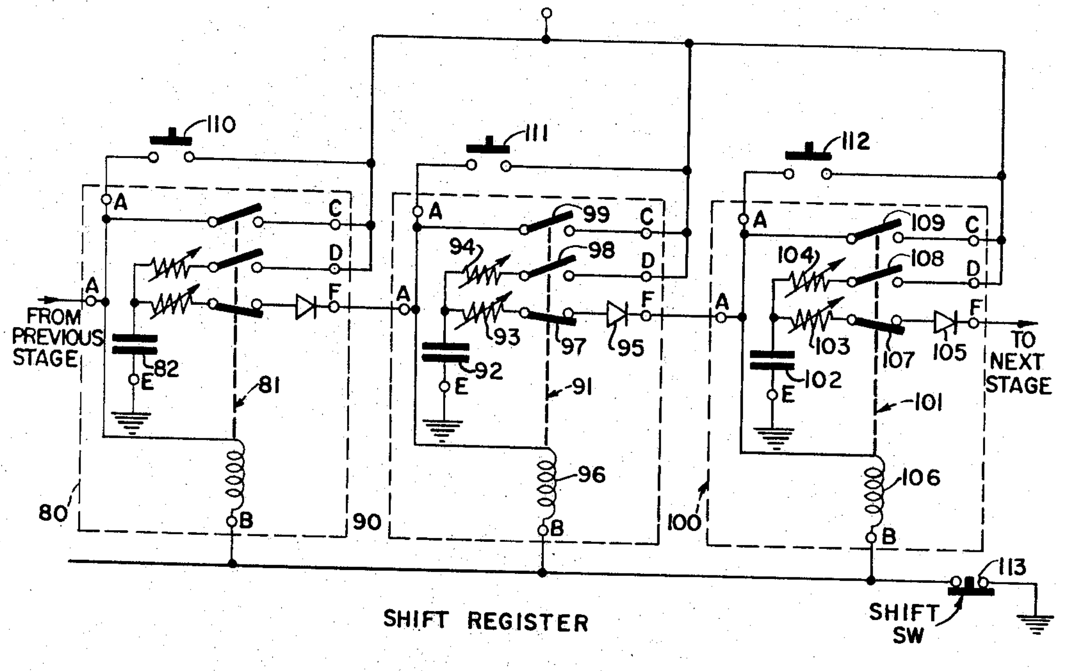
FIG. 5 is a schematic diagram illustrating the manner in which a plurality of modular units can be interconnected to form a shift register.

The manner in which a plurality of the modular units can be interconnected to provide a shift register is illustrated in FIG. 5, wherein modular units 80, 90 and 100 are illustrated. The components in these modular units are designated by reference numerals 81–89, 91–99, and 101–109, respectively, corresponding to reference numerals 1–9, FIG. 2*a*. In the shift register of FIG. 5, selected ones of the relays can be placed in the energized state by actuating selected ones of the push button switches 110, 111 and 112. Thereafter, upon each successive actuation of shift switch 113, the energized states will be transferred to the adjacent relays to the right, as viewed in FIG. 5.

The C and D terminals in each of the modular units are connected to the positive source of potential and the E terminals are each connected to ground. The F terminal is connected to the A terminal of the adjacent modular unit to the right. Normally open push button switches 110, 111, and 112 are connected between the positive source of potential and the A terminal of modular units 80, 90, and 100, respectively. Terminals B of each of the modular units are connected together and to ground via a normally closed push button shift switch 113. The usable outputs from the shift register are derived via additional contacts such as contacts 10, FIG. 2*a*, or contacts 29, FIG. 2*b*, of relays 81, 91, and 101. Although the shift register shown in FIG. 4 includes three stages, it should be obvious that any number of stages can be added in essentially the same fashion by interconnection of the F and A terminals.

When push button switch 110 is actuated, relay 81 is energized by current flow through switch 110, actuating winding 86 and shift switch 113. When relay 81 is energized, contacts 89 are closed, thereby completing a HOLD circuit which maintains relay 81 in the energized state by current flow through contacts 89, actuating winding 86, and shift switch 113. Also, when relay 81 is energized, current flows through contacts 88 and resistor 84, thereby charging capacitor 82. Similarly when switch 111 is actuated, relay 91 becomes energized and is maintained in the energized state by means of the HOLD circuit completed via contacts 99. Capacitor 92 is charged via contacts 98 and resistor 94 when relay 91 is energized. Switch 112, when actuated, causes energization of relay 101, which is maintained in the energized state by the HOLD circuit completed through contacts 109, and capacitor 102 is charged via contacts 108 and resistor 104 while the relay is in the energized state.

The operation of the shift register circuit can thus be explained by first assuming that only relay 81 is in the energized state. Thereafter, when shift switch 113 is actuated, the HOLD circuit for actuating winding 86 is interrupted and therefore relay 81 returns to the de-energized state. This causes contacts 88 and 89 to open, and also causes contacts 87 to close, connecting capacitor 82 to actuating winding 96. Thereafter, when shift switch 113 is returned to the normally closed position, capacitor 82 is discharged via resistor 83, contacts 87, diode 85, actuating winding 96, and shift switch 113, thereby initially energizing relay 91. As a result, contacts 99 are closed to complete a HOLD circuit for actuating winding 96, and contacts 98 are closed, permitting capacitor 92 to charge via contacts 98 and resistor 94. Thus, the first actuation of shift switch 113 has shifted the energized state from relay 81 to relay 91.

The second actuation of shift switch 113 would further shift the energized state from relay 91 to relay 101. This is accomplished in essentially the same fashion just described, since when contacts 113 are opened, the HOLD circuit for relay 91 is interrupted, thereby causing relay 91 to return to the degenerized state. Contacts 97 connected capacitor 92 to actuating winding 106, and therefore when shift switch 113 is returned to the normally closed position, capacitor 92 discharges to energize winding 106. Once winding 106 is initially energized, a HOLD circuit is completed through contacts 109 and capacitor 102 is charged via contacts 108.

Thus, it is seen that the energized state of the relay is transferred one stage to the right upon each successive actuation of shift switch 113. If more than one of the relays are initially energized, the shift register will operate to shift the energized states toward the right in essentially the same fashion just described. In other words, if push button switches 110 and 111 were initially actuated, thereby placing relays 81 and 91 in the energized state, actuation of shift switch 113 would place relays 91 and 101 in the energized state.

Diodes 85, 95, and 105 provide isolation for the respective capacitors 82, 92, and 102, so that the capacitors cannot be charged via the HOLD circuit of the adjacent stage to the right. Resistors 84, 94, and 104 are adjusted so that the respective capacitors 82, 92, and 102 become fully charged during the minimum time interval anticipated between successive actuations of shift switch 113. Resistors 83, 93, and 103 are adjusted to provide maximum energization of the actuating winding in the stage to the right while the associated capacitor is being discharged.

Figure 6:
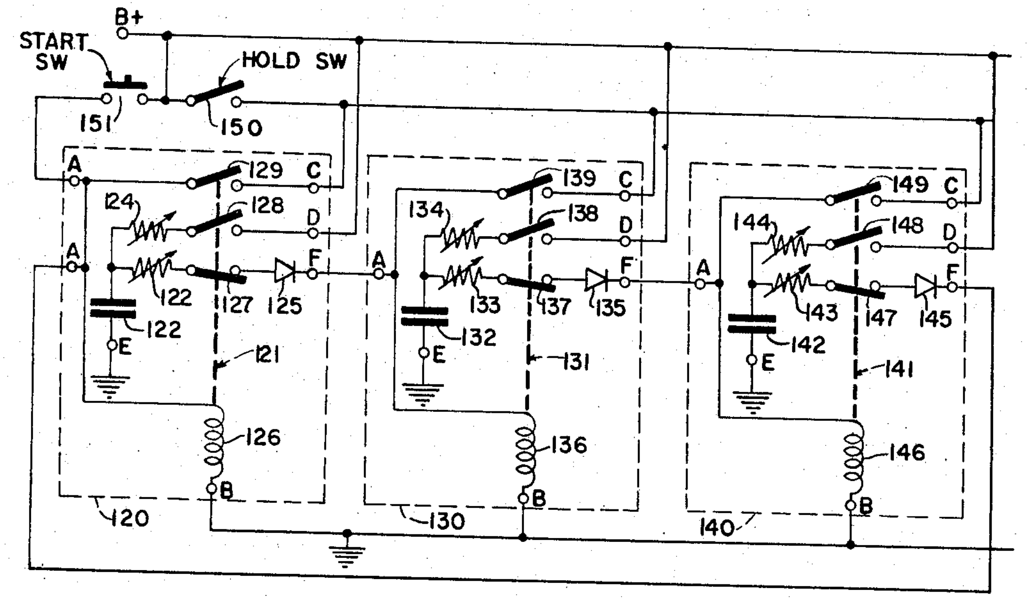
FIG. 6 is a schematic diagram illustrating the manner in which a plurality of modular units can be interconnected to form a pulse distributor circuit.

The manner in which three of the modular units can be interconnected to form a three-stage distributor pulse circuit in accordance with this invention is illustrated schematically in FIG. 6. The distributor circuit includes modular units 120, 130, and 140, including, respectively, components 121–129, 131–139, and 141–149, corresponding respectively to components 1–9, FIG. 2*a*. A start switch 151 is provided to place one of the relays initially in the energized state. The distributor circuit thereafter operates to successively transfer the energized states of the other relays in a continuous repetitive fashion. A HOLD switch 150 is provided to stop the transfer operation momentarily.

Terminal D in each of the modular units is connected to the positive source of potential, and terminals E and B are connected to ground. Terminals C of each of the modular units are connected to one another and to the positive source of potential via normally open HOLD switch 150. The F terminal of unit 120 is connected to the A terminal of unit 130, the F terminal of unit 130 is connected to the A terminal of unit 140, and the F terminal of unit 140 is connected to the A terminal of unit 120. If more than three stages are included in the distributor circuit, the F terminal of unit 140 would be connected to the A terminal of the next succeeding stage, and the F terminal of the last stage would be connected to the A terminal of the first stage, which is unit 120. Normally open push button start switch 151 is connected between the A terminal of unit 120 and the positive source of potential.

When push button switch 151 is actuated, current flows through the start switch and actuating winding 126, thereby energizing relay 121. When relay 121 is energized, contacts 128 are closed and therefore capacitor 122 is charged by means of current flow through contacts 128 and resistor 124. Thereafter, when start switch 151 returns to the normally open position, relay 121 is de-energized and capacitor 122 immediately begins to discharge via resistor 123, contacts 127, diode 125, and actuating winding 136. Accordingly, relay 131 is energized and remains energized until capacitor 122 is sufficiently discharged so that the current flow through actuating winding 136 falls below the level required to maintain relay 131 in the energized state. Capacitor 132 is charged via contacts 138 and resistor 134 while relay 131 is energized, and immediately begins to discharge via resistor 133, contacts 137, diode 135, and actuating winding 146 when relay 131 is subsequently de-energized. Thus, relay 141 next becomes energized and capacitor 142 is charged while relay 141 is in the energized state. Subsequently, when relay 141 is de-energized, capacitor 142 is discharged to energize actuating winding 126. When actuating winding 126 is energized, capacitor 122 is charged, and subsequently discharges to energize actuating winding 136. Thus, it is seen that the energized state continues to transfer successively from relay to relay.

If, for example, relay 131 is energized when HOLD switch 150 is closed, current will flow through switch 150, contacts 139, and actuating winding 136, thereby maintaining relay 131 in the energized state. Under these circumstances, the energized state cannot be transferred to the next successive relay, namely, relay 141. However, when HOLD switch 150 is subsequently returned to the open position, relay 131 is de-energized and therefore capacitor 132 discharges to energize actuating winding 146. Thus, it is seen that the closing of switch 150 maintains the energized relay in the energized state via a circuit completed via either contacts 129, 139, or 149. When HOLD switch 150 is returned to the open position, the operation of the distributor circuit continues from the point where it left off.

Diodes 125, 135, and 145 provide isolation for their associated capacitors 122, 132, and 142, so that these capacitors cannot be charged while HOLD switch 150 is in the closed position. Resistors 124, 134, and 144 are adjusted to relatively low impedance values so that the associated capacitors are charged during the time interval when the associated relay is energized. Capacitors 123, 133, and 143 determine the discharging time constant for the associated capacitors, and therefore determine the length of time required to shift the energized state to an adjacent stage. Thus, resistors 123, 133, and 143 are adjusted to achieve the desired time delay between the successive transfers of the energized state.

Figure 7:
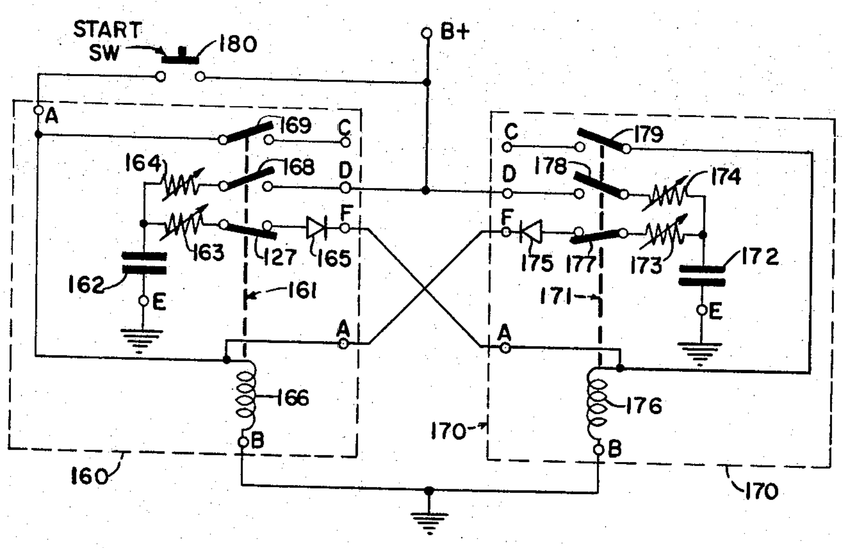
FIG. 7 is a schematic diagram illustrating the manner in which a pair of modular units can be interconnected to form a free running multivibrator circuit.

The manner in which two of the modular units may be interconnected to provide a free-running multivibrator circuit is illustrated in FIG. 7. This multivibrator includes modular units 160 and 170 comprising, respectively, components 161–169 and 171–179. The designation of these components corresponds to the designation for similar components 1–9, respectively, FIG. *2a*. The circuit is placed in operation by momentarily actuating a start switch 180 which initially energizes relay 161. Thereafter, the energized state is transferred back and forth between relays 161 and 171 at a frequency which is determined by the adjustments of resistors 163 and 173.

The D terminals of modular units 160 and 170 are connected to a positive source of potential and the E and B terminals are connected to ground. The F terminal of unit 160 is connected to the A terminal of 170 and the F terminal of unit 170 is connected to the A terminal of unit 160. The A terminal of unit 160 is connected to the positive source of potential via a normally open push button start switch 180. The usable outputs are derived from additional contacts (not shown) of relays 161 and 171, which may be provided as seen at 10 and 29 in FIGS. *2a* and *2b*, respectively.

When start switch 180 is actuated, current flows through the start switch in actuating winding 166, initially energizing relay 161. When relay 161 is energized, current flows through contacts 168 and resistor 164 to charge capacitor 162. Thereafter, when start switch 180 is returned to the normally open position, relay 161 is de-energized and therefore capacitor 162 immediately begins to discharge via resistor 163, contacts 167, diode 165, and actuating winding 176. Relay 171 is therefore energized while capacitor 162 is discharging. Capacitor 172 is charged via contacts 178 and resistor 174 while relay 171 is energized. When capacitor 162 is sufficiently discharged so that relay 171 returns to the de-energized state, capacitor 172 discharges via resistor 173, contacts 177, and diode 175, thereby energizing relay 166. While relay 161 is energized, capacitor 162 is charged, and thereafter, when relay 161 returns to the de-energized state, capacitor 162 discharges, again energizing winding 176. Thus, the energized state continually transfers back and forth between relays 161 and 171 to provide a multivibrator operation.

Diodes 165 and 175 perform no particular function in the multivibrator circuit arrangement, and contacts 169 and 179 are not connected. Resistors 164 and 174 are adjusted so that the associated capacitors will become fully charged during the time interval in which the associated relay is in the energized state. Resistors 163 and 173 determine the discharging time constant for capacitors 162 and 172, respectively, and therefore determine the oscillating frequency for the multivibrator circuit. Accordingly, these resistors are adjusted to achieve the desired operating frequency.

Though the circuit embodiments of FIGS. 3–7 have been illustrated and described as employing the modular unit circuit of FIG. *2a*, the circuit of FIG. *2b* can be employed instead when adjustability of the charging and discharging times for the capacitors is not required.

While a few of the specific embodiments of the invention have been described in detail, it should be obvious to one skilled in the art that there are numerous variations within the scope of this invention. The invention is more particularly defined in the appended claims.

What is claimed is:

1. A modular unit for computer circuits comprising:
an electromagnetic relay including at least
- an actuating winding,
- a first and a second set of normally open contacts, and
- a set of normally closed contacts;

first circuit means connecting said first set of contacts to said actuating winding to provide a hold circuit via which current can flow, when said first set of contacts is closed, to maintain said actuating winding energized;
a capacitor;
second circuit means connecting said second set of contacts to said capacitor so that current can flow through said second set of contacts to charge said capacitor when said relay is energized;
a semiconductor diode; and
third circuit means connecting said capacitor, said diode and said normally closed contacts in series so that discharge current can flow from said capacitor and through said diode when said relay is de-energized.

2. A modular unit in accordance with claim 1 and further comprising
first resistance means connected in said first circuit means between said second set of contacts and said capacitor; and
second resistance means connected in said third circuit means between said normally closed contacts and said capacitor.

3. A modular unit in accordance with claim 2 and wherein
said first and second resistance means are variable resistors adapted to control, respectively, the charging and discharging time constants of said capacitor.

4. A modular unit for computer circuits, comprising:
a plurality of connection terminals;
an electromagnetic relay including at least
- an actuating winding connected between a pair of said terminals,
- a first and a second set of normally open contacts, and
- a set of normally closed contacts;

a capacitor;
a semiconductor diode;
circuit means for connecting said first set of contacts between another pair of said terminals and to one end of said actuating winding; and
circuit means for connecting one plate of said capacitor to one of said terminals and for connecting the other plate of said capacitor to another of said terminals via said second set of contacts and to still another of said terminals via said normally closed contacts and said diode.

5. A modular unit in accordance with claim 4 and further comprising a first variable resistor connected between said capacitor and said second set of contacts, and a second variable resistor connected between said capacitor and said set of normally closed contacts.

6. A bistable circuit comprising a pair of electromagnetic relays each including at least an actuating winding, a first and a second set of normally open contacts, and a set of normally closed contacts;

a capacitor associated with each of said relays;

a semiconductor diode associated with each of said relays;

switching means connected to both of said actuating windings for selectively disconnecting said windings from a source of potential when said means is actuated;

a hold circuit associated with each of said relays and including said first set of contacts associated therewith connected so that current will flow from a source of potential, through said associated actuating winding and said switching means, via the associated set of first contacts whereby said associated relay, once initially energized, is maintained in the energized state until said switching means is actuated;

a charging circuit associated with each of said relays including said associated set of second contacts and said associated capacitor connected so that charging current flows from the source of potential to said associated capacitor via said associated second set of contacts when the associated relay is energized; and a discharging circuit associated with each of said relays and including said associated capacitor, said associated diode and said associated set of normally closed contacts connected so that said associated capacitor can be discharged via said associated normally closed contacts and diode to energize said actuating winding of the non-associated relay when said associated relay is de-energized, provided said switching means is not actuated.

7. Apparatus in accordance with claim 6 further comprising circuit means for initially energizing one of said relays so that subsequent actuations of said switching means transfers the energized state to the alternate one of said relays.

8. A free running multivibrator circuit comprising a pair of electromagnetic relays each including at least an actuating winding, a set of normally open contacts, and a set of normally closed contacts;

a capacitor associated with each of said relays;

a semiconductor diode associated with each of said relays;

a charging circuit associated with each of said relays including said associated set of normally open contacts and said associated capacitor connected so that charging current flows from a source of potential to said associated capacitor via said associated set of normally open contacts when the associated relay is energized; and a discharging circuit associated with each of said relays and including said associated capacitor, said associated diode, and said associated set of normally closed contacts connected so that said associated capacitor is discharged via said associated normally closed contacts and said associated diode to energize said actuating winding of the non-associated relay when said associated relay is de-energized.

9. Apparatus in accordance with claim 8 further comprising circuit means for initially energizing one of said relays so that the energized state will thereafter transfer back and forth between said relays as said capacitors are discharged.

10. Apparatus in accordance with claim 8 further comprising impedance means connected between each of said capacitors and the associated set of normally closed contacts whereby said impedance means controls the discharge time of said capacitors.

References Cited

UNITED STATES PATENTS

| | | | |
|---|---|---|---|
| 2,606,234 | 8/1952 | Nijman | 317—140 |
| 2,608,608 | 8/1952 | Handschin | 317—141 |
| 3,244,942 | 4/1966 | Deeg | 340—168 X |

JOHN W. CALDWELL, *Primary Examiner.*

NEIL C. READ, *Examiner.*

D. J. YUSKO, *Assistant Examiner.*